United States Patent
Katayama et al.

(10) Patent No.: US 9,166,251 B2
(45) Date of Patent: Oct. 20, 2015

(54) BATTERY SEPARATOR AND NONAQUEOUS ELECTROLYTE BATTERY

(75) Inventors: Hideaki Katayama, Ibaraki (JP); Mitsuhiro Kishimi, Ibaraki (JP); Yoshinori Sato, Ibaraki (JP); Yasutaka Kuroki, Ibaraki (JP); Toshiyuki Edamoto, Ibaraki (JP)

(73) Assignee: HITACHI MAXELL, LTD., Ibaraki-Shi (JP)

( * ) Notice: Subject to any disclaimer, the term of this patent is extended or adjusted under 35 U.S.C. 154(b) by 846 days.

(21) Appl. No.: 12/673,961

(22) PCT Filed: Sep. 30, 2008

(86) PCT No.: PCT/JP2008/067757
§ 371 (c)(1),
(2), (4) Date: Feb. 17, 2010

(87) PCT Pub. No.: WO2009/044741
PCT Pub. Date: Apr. 9, 2009

(65) Prior Publication Data
US 2011/0052987 A1    Mar. 3, 2011

(30) Foreign Application Priority Data
Oct. 3, 2007  (JP) .................................. 2007-259575
Feb. 21, 2008 (JP) .................................. 2008-039527

(51) Int. Cl.
*H01M 2/14* (2006.01)
*H01M 10/0525* (2010.01)
(Continued)

(52) U.S. Cl.
CPC .......... *H01M 10/0525* (2013.01); *H01M 2/166* (2013.01); *H01M 2/1646* (2013.01); *H01M 2/1653* (2013.01); *H01M 10/4235* (2013.01); *Y02E 60/122* (2013.01)

(58) Field of Classification Search
CPC .... H01M 2/1686; H01M 2/1673; H01M 2/14
USPC ................................................. 429/144, 145
See application file for complete search history.

(56) References Cited

U.S. PATENT DOCUMENTS

| | | |
|---|---|---|
| 6,447,958 B1 | 9/2002 | Shinohara et al. |
| 2001/0005560 A1 | 6/2001 | Yoshida et al. |

(Continued)

FOREIGN PATENT DOCUMENTS

| | | |
|---|---|---|
| CN | 101019266 A | 8/2007 |
| EP | 1 115 166 A1 | 7/2001 |

(Continued)

*Primary Examiner* — Stewart Fraser
*Assistant Examiner* — Olatunji Godo
(74) *Attorney, Agent, or Firm* — Birch, Stewart, Kolasch & Birch, LLP

(57) ABSTRACT

A nonaqueous electrolyte battery of the present invention includes a positive electrode having a positive active material capable of intercalating and deintercalating a lithium ion, a negative electrode having a negative active material capable of intercalating and deintercalating a lithium ion, a separator interposed between the positive electrode and the negative electrode, and a nonaqueous electrolyte. The heat generation starting temperature of the positive electrode is 180° C. or higher. The separator includes heat-resistant fine particles and a thermoplastic resin. The proportion of particles with a particle size of 0.2 μm or less in the heat-resistant fine particles is 10 vol % or less and the proportion of particles with a particle size of 2 μm or more in the heat-resistant fine particles is 10 vol % or less. The separator effects a shutdown in the range of 100° C. to 150° C.

37 Claims, 2 Drawing Sheets

(51) Int. Cl.
*H01M 2/16* (2006.01)
*H01M 10/42* (2006.01)

(56) References Cited

U.S. PATENT DOCUMENTS

| | | |
|---|---|---|
| 2004/0191611 A1 | 9/2004 | Imachi et al. |
| 2006/0141352 A1* | 6/2006 | Kato et al. ................ 429/144 |
| 2007/0231700 A1 | 10/2007 | Watanabe |
| 2007/0264577 A1 | 11/2007 | Katayama et al. |
| 2008/0038631 A1 | 2/2008 | Nakura et al. |
| 2010/0221965 A1 | 9/2010 | Katayama et al. |

FOREIGN PATENT DOCUMENTS

| | | |
|---|---|---|
| JP | 2000-30686 A | 1/2000 |
| JP | 2004-296325 A | 10/2004 |
| JP | 2004-303474 A | 10/2004 |
| JP | 2006-139978 A | 6/2006 |
| JP | 2006-269359 A | 10/2006 |
| JP | 2006-351386 A | 12/2006 |
| JP | 2007-157723 A | 6/2007 |
| JP | 2007-273123 A | 10/2007 |
| JP | 2007-273443 A | 10/2007 |
| JP | 2007-280911 A | 10/2007 |
| JP | 2007-335294 A | 12/2007 |
| JP | 2008-27634 A | 2/2008 |
| JP | 2008-123996 A | 5/2008 |
| JP | 2008-210541 A | 9/2008 |
| KR | 10-2007-0083975 A | 8/2007 |
| WO | WO-00/79618 A1 | 12/2000 |
| WO | WO 2006/062153 A1 | 6/2006 |
| WO | WO-2007/066768 A1 | 6/2007 |
| WO | WO 2009/096451 A1 | 8/2009 |

* cited by examiner

BATTERY SEPARATOR AND NONAQUEOUS ELECTROLYTE BATTERY

CROSS REFERENCE TO RELATED APPLICATIONS

This application is a National Phase application of PCT/JP2008/067757 filed on Sep. 30, 2008, which claims the benefit under 35 U.S.C. §119(a) to Japanese Patent Application Nos. 2007-259575 (filed on Oct. 3, 2007), and 2008-039527 (filed on Feb. 21, 2008). The entire contents of all of the above applications are hereby incorporated by reference.

TECHNICAL FIELD

The present invention relates to a nonaqueous electrolyte battery that is safe from being allowed to stand at high temperatures.

BACKGROUND ART

A nonaqueous electrolyte battery such as a lithium ion battery is characterized by a high energy density and thus has been widely used as a power source for portable equipment such as a portable telephone and a notebook personal computer. In recent years, the capacity of the nonaqueous electrolyte battery is likely to increase further as the performance of the portable equipment becomes higher. In parallel with this, it is also important to ensure safety.

In the current nonaqueous electrolyte battery, e.g., a polyolefin microporous film with a thickness of about 20 to 30 μm is used as a separator that is interposed between a positive electrode and a negative electrode. However, the commonly used separator easily shrinks when the temperature in the battery becomes extremely high, and can cause a short circuit. Therefore, as a means of improving the safety of the nonaqueous electrolyte battery, the heat resistance of the separator may be improved.

On the other hand, e.g., when the nonaqueous electrolyte battery in a charged state is placed in a high-temperature environment, heat can be generated from the positive electrode to raise the temperature in the battery further. Therefore, as a means of improving the safety of the nonaqueous electrolyte battery, a positive active material having high thermal stability also may be used.

For example, Patent Documents 1 and 2 propose a nonaqueous electrolyte battery that uses a positive active material having high thermal stability along with a separator having good heat resistance. However, in the technology as disclosed in Patent Document 1, there is a limit to the reduction in thickness of the separator because a nonwoven fabric or paper is used for the separator. For example, if the separator has a thickness of 30 μm or less and an active material such as graphite is used for the negative electrode, a short circuit may be likely to occur. Moreover, the technology as disclosed in Patent Document 2 focuses only on thermal shrinkage of the separator at 120° C. Thus, it is difficult to ensure the safety of the battery at temperatures higher than this.

Patent Documents 3 to 7 propose a multilayer separator that includes a high heat-resistant layer as a technology for preventing a short circuit due to thermal shrinkage of the separator. However, the separator needs to be further improved to achieve the safety of the battery at even higher temperatures.

For example, in the case of an electrode body obtained by winding the positive electrode and the negative electrode with the separator interposed between them, a short circuit can occur due to thermal shrinkage of the separator in the width direction. Thus, it is necessary to suppress the thermal shrinkage in the width direction.

Patent Document 1: JP 2004-296325 A
Patent Document 2: JP 2004-303474 A
Patent Document 3: JP 2006-351386 A
Patent Document 4: WO 2007/66768
Patent Document 5: JP 2007-273123 A
Patent Document 6: JP 2007-273443 A
Patent Document 7: JP 2007-280911 A

DISCLOSURE OF INVENTION

Therefore, with the foregoing in mind, it is an object of the present invention to provide a battery separator that can constitute a nonaqueous electrolyte battery having excellent safety in a high-temperature environment, and a nonaqueous electrolyte battery using the battery separator.

A battery separator of the present invention includes heat-resistant fine particles and a thermoplastic resin. The proportion of particles with a particle size of 0.2 μm or less in the heat-resistant fine particles is 10 vol % or less and the proportion of particles with a particle size of 2 μm or more in the heat-resistant fine particles is 10 vol % or less. A shutdown is effected in the range of 100° C. to 150° C.

A nonaqueous electrolyte battery of the present invention includes the following: a positive electrode having a positive active material capable of intercalating and deintercalating a lithium ion; a negative electrode having a negative active material capable of intercalating and deintercalating a lithium ion; a separator interposed between the positive electrode and the negative electrode; and a nonaqueous electrolyte. A heat generation starting temperature of the positive electrode is 180° C. or higher. The separator includes heat-resistant fine particles and a thermoplastic resin. The proportion of particles with a particle size of 0.2 μm or less in the heat-resistant fine particles is 10 vol % or less and the proportion of particles with a particle size of 2 μm or more in the heat-resistant fine particles is 10 vol % or less. The separator effects a shutdown in the range of 100° C. to 150° C.

In the nonaqueous electrolyte battery of the present invention, the heat generation starting temperature of the positive electrode is as high as 180° C. or higher. This can suppress heat to be generated from the positive electrode when the battery is placed in a high-temperature environment. Moreover, the nonaqueous electrolyte battery uses the battery separator that includes a thermoplastic resin and heat-resistant fine particles containing particles with a particle size of 0.2 μm or less in a proportion of 10 vol % or less and particles with a particle size of 2 μm or more in a proportion of 10 vol % or less, and that effects a shutdown in the range of 100° C. to 150° C. This can reliably prevent a short circuit due to contact between the positive electrode and the negative electrode at high temperatures. As a result of these effects, it is possible to provide a nonaqueous electrolyte battery having excellent safety in a high-temperature environment.

BEST MODE FOR CARRYING OUT THE INVENTION

Figure 1A:
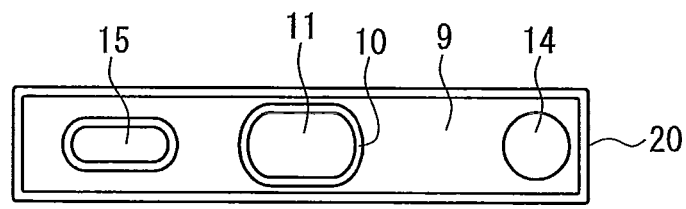
FIG. 1A is a schematic plan view of a nonaqueous electrolyte battery of the present invention.

The heat generation starting temperature of the positive electrode of the nonaqueous electrolyte battery of the present invention is 180° C. or higher, and preferably 200° C. or higher.

In the present specification, the heat generation starting temperature of the positive electrode is determined as follows. First, a DSC curve is obtained by measuring the positive electrode in a charged state with a differential scanning calorimeter (DSC) from 30° C. at a rate of temperature rise of 10° C./min in the presence of a nonaqueous electrolyte used for the battery (as will be described later). In this DSC curve, the heat generation starting temperature indicates a temperature at an intersection point of two lines: one is an extension line of the base line on the high temperature side; and the other is a tangent to the curve of the exothermic peak on the low temperature side at a point where the curve has the maximum slope. The "charged state" of the positive electrode indicates a full-charge state according to the battery design. Specifically, assuming that the rated charging voltage of the battery is $V_{max}$, a constant-current and constant-voltage charge is performed in such a manner that the battery is charged at a constant current until the battery voltage reaches the $V_{max}$, and subsequently charged at a constant voltage of $V_{max}$. The battery is considered in the full-charge state when the current value during the constant-voltage charge is reduced to 1/10 of a current value (1 C) based on the rated capacity of the battery.

The positive electrode of the present invention includes a current collector and a positive electrode mixture layer formed on one side or both sides of the current collector. The positive electrode mixture layer is composed of a positive electrode mixture that is obtained by mixing a positive active material, a conductive assistant, a binder, etc.

To set the heat generation starting temperature of the positive electrode at 180° C. or higher, it is preferable to use the positive active material having good thermal stability and a high heat generation starting temperature. Specifically, it is preferable to use at least one compound selected from the following: a spinel-type lithium-containing complex oxide expressed as a general formula $Li_{1+t}Mn_{(2-x)}M^1{}_xO_4$ (where $M^1$ is at least one element selected from the group consisting of Fe, Ni, Mg, Zn, Co, Cr, Al, B, V, Si, Sn, Nb, Ta, Cu, Mo, Ti, and W, $-0.1 \leq t \leq 0.1$, and $0 \leq x \leq 0.6$); an olivine-type lithium-containing complex oxide expressed as a general formula $LiM^2PO_4$ (where $M^2$ is Co, Ni, Mn, or Fe); a lithium-containing complex oxide having a layered crystal structure expressed as a general formula $Li_{(1+a)}M^3{}_{2b}Mn_{(0.5-b)}Ni_{(0.5-b)}O_2$ (where $M^3$ is at least one element selected from the group consisting of Fe, Mg, Zn, Co, Cr, Al, B, V, Si, Sn, Nb, Ta, Cu, Mo, Ti, and W, $-0.1 < a < 0.1$, and $0 \leq b \leq 0.05$); and a lithium-containing complex oxide expressed as a general formula $Li_{(1+y+\alpha)}Ni_{(1-y-z-\delta)/2}Mn_{(1-y-z-\delta)/2}M^4{}_zO_2$ (where $M^4$ is at least one element selected from the group consisting of Ti, Cr, Fe, Co, Cu, Zn, Al, Ge, Sn, Mg, and Zr, $-0.1 \leq y \leq 0.1$, $-0.05 \leq \alpha \leq 0.05$, $0 \leq z < 0.45$, and $-0.24 \leq \delta \leq 0.6$). In particular, the lithium-containing complex oxide expressed as the general formula $Li_{(1+y+\alpha)}Ni_{(1-y-z-\delta)/2}Mn_{(1-y-z-\delta)/2}M^4{}_zO_2$ is preferred, in which $0 \leq y \leq 0.05$ is more preferred, $0 \leq z \leq 0.4$ is more preferred, $-0.1 \leq \delta$ is more preferred, and $\delta \leq 0.24$ is more preferred.

Although only the above compounds can be used as the positive active material, another compound such as $LiCoO_2$ having a low heat generation starting temperature may be used with the above compounds unless the heat generation starting temperature of the positive electrode is below 180° C. The particle size of the positive active material is preferably 0.01 to 30 μm.

The conductive assistant of the positive electrode may be a carbon material such as carbon black. The binder of the positive electrode may be a fluorocarbon resin such as polyvinylidene fluoride (PVDF).

The current collector of the positive electrode may be, e.g., a foil, a punched metal, a mesh, or an expanded metal, which are made of aluminum or the like. In general, an aluminum foil with a thickness of 10 to 30 μm can be suitably used.

A lead portion of the positive electrode is generally provided in the following manner. A part of the current collector remains exposed without forming the positive electrode mixture layer when the positive electrode is produced, and this exposed portion can serve as the lead portion. However, the lead portion does not necessarily need to be integrated with the current collector from the beginning and may be provided by connecting an aluminum foil or the like to the current collector afterward.

The composition of the positive electrode mixture layer of the positive electrode is preferably 80 to 98 mass % of the positive active material, 1 to 18 mass % of the conductive assistant, and 1 to 10 mass % of the binder. The thickness of the positive electrode mixture layer (per one side of the current collector) is preferably 20 to 100 μm.

To suppress thermal shrinkage and provide a shutdown property, it is preferable that the separator of the nonaqueous electrolyte battery of the present invention has a multilayer structure. Specifically, the multilayer structure includes a heat-resistant layer for suppressing the thermal shrinkage and isolating the positive electrode from the negative electrode at high temperatures and a shutdown layer for ensuring the shutdown property.

In the present specification, a shutdown is effected in such a manner that the resin constituting the separator is melted at a temperature not more than the thermal runaway (abnormal heat generation) temperature of the battery and the pores of the separator are filled with the molten resin, thereby increasing the internal resistance of the battery to interrupt the current.

A temperature at which the separator effects a shutdown (i.e., a shutdown temperature) is preferably 100° C. or higher, since if the shutdown temperature is too low, a shutdown is effected during the normal operation of the battery, and thus can increase the internal resistance of the battery. On the other hand, if the shutdown temperature of the separator is too high, the current interruption does not succeed by a shutdown when heat is rapidly generated due to, e.g., an internal short circuit of the battery. Therefore, the temperature in the battery is raised to a temperature close to or higher than the exothermic peak temperature of the positive active material, which may result in thermal runaway. Thus, the shutdown temperature is preferably at least 20° C. lower than the exothermic peak temperature of the positive electrode (i.e., the temperature at an apex of the exothermic peak of the DSC curve that is obtained to determine the heat generation starting temperature, as described above), and more preferably 150° C. or lower.

The separator has a structure in which the heat-resistant layer may be either integrated with the shutdown layer (i.e., a single film separator) or not integrated with the shutdown layer. In both cases, the shutdown temperature in the present specification is defined as a temperature at which a Gurley value obtained by a method according to the Japanese Industrial Standards (JIS) P 8117 and expressed as the length of time (seconds) it takes for 100 ml air to pass through a membrane at a pressure of 0.879 g/mm² is at least ten times as large as the Gurley value at room temperature before heating.

The heat-resistant layer of the separator is preferably a porous layer including heat-resistant fine particles and a binder as components. In the present specification, the "heat-resistant fine particles" are fine particles with a heat-resistant temperature of 200° C. or higher, and the "heat-resistant temperature" is a temperature at which a substantial physical change such as a thermal deformation does not occur.

The heat-resistant fine particles are not particularly limited as long as they are electrochemically stable and have electrical insulation, but are preferably inorganic fine particles. Specific examples of the inorganic fine particles include the following: fine particles of inorganic oxides such as an iron oxide, silica ($SiO_2$), alumina ($Al_2O_3$), $TiO_2$, and $BaTiO_3$; fine particles of inorganic nitrides such as an aluminum nitride and a silicon nitride; fine particles of hardly-soluble ionic crystals such as a calcium fluoride, a barium fluoride, and a barium sulfate; and fine particles of covalent crystals such as silicon and diamond. The inorganic oxide fine particles may be fine particles of materials derived from the mineral resources such as boehmite, zeolite, apatite, kaoline, mullite, spinel, olivine, and mica or artificial products of these materials. Moreover, the inorganic fine particles may be electrically insulating particles obtained by covering the surface of a conductive material with a material having electrical insulation (e.g., any of the above inorganic oxides). Examples of the conductive material include conductive oxides such as a metal, $SnO_2$, and an indium tin oxide (ITO) and carbonaceous materials such as carbon black and graphite.

Organic fine particles also can be used as the heat-resistant fine particles. Specific examples of the organic fine particles include the following: fine particles of cross-linked polymers such as polyimide, a melamine resin, a phenol resin, cross-linked polymethyl methacrylate (cross-linked PMMA), cross-linked polystyrene (cross-linked PS), polydivinylbenzene (PDVB), and a benzoguanamine-formaldehyde condensation product; and fine particles of heat-resistant polymers such as thermoplastic polyimide. The organic resin constituting these organic fine particles may be a mixture, a modified product, a derivative, a copolymer (a random copolymer, an alternating copolymer, a block copolymer, or a graft copolymer), or a cross-linked product (in the case of the heat-resistant polymer) of the above polymeric materials.

The above examples of the heat-resistant fine particles may be used individually or in combination of two or more. Among the above heat-resistant fine particles, the inorganic oxide fine particles are more suitable, and alumina, silica, and boehmite are even more suitable. This is because these materials have a high heat-resistant temperature as well as high electrochemical stability.

The heat-resistant fine particles contain particles with a particle size of 0.2 µm or less in a proportion of 10 vol % or less and particles with a particle size of 2 µm or more in a proportion of 10 vol % or less, and also have a narrow particle size distribution and a uniform particle size. This configuration can suppress thermal shrinkage of the separator at a temperature T (° C.) that is close to, e.g., 10° C. lower than the heat generation starting temperature of the positive electrode (in this case, the upper limit of T is 200° C., and T does not exceed 200° C. even if the heat generation starting temperature of the positive electrode is higher than 210° C.). Thus, it is possible to prevent the electrode body from being short-circuited due to the thermal shrinkage of the separator in the width direction.

To make the proportions of particles with a particle size of 0.2 µm or less and particles with a particle size of 2 µm or more in the heat-resistant fine particles not more than 10 vol %, respectively, the particle size of the material particles may be controlled in the range of 0.2 to 2 µm. If the particle size of the material particles is too large, the material particles can be pulverized with a grinder such as a ball mill, a sand mill, a jet mill, or a cyclone mill to reduce the particle size. If the particle size of the material particles is too small, the particles size can be increased with a granulator such as mechanofusion or a spray drier. Moreover, the particles with a particle size of 0.2 µm or less and the particles with a particle size of 2 µm or more may be filtered out with various types of classifiers such as a sieve, a classification cyclone, and a filter, so that the remaining particles are used.

The thermal shrinkage ratio of the separator of the present invention is preferably 10% or less, and more preferably 5% or less at the temperature T. Specifically, the thermal shrinkage ratio of the separator in the width direction is preferably 10% or less at 200° C. By controlling the particle size of the heat-resistant fine particles, the separator with such a small thermal shrinkage ratio can be achieved even if the separator has a structure in which the heat-resistant layer is integrated with the shutdown layer. Thus, it is possible to sufficiently suppress the occurrence of a short circuit due to shrinkage of the separator when the temperature in the battery becomes high. The thermal shrinkage ratio is preferably as small as possible, and particularly preferably 0%.

When the separator has a structure in which the heat-resistant layer and the shutdown layer are not integrated, but separated from each other, the thermal shrinkage ratio of the heat-resistant layer is preferably 10% or less, and more preferably 5% or less at the temperature T. Specifically, the thermal shrinkage ratio of the heat-resistant layer in the width direction is preferably 10% or less at 200° C. In this case, the above thermal shrinkage ratio also can be ensured by controlling the particle size of the heat-resistant fine particles. Thus, it is possible to sufficiently suppress the occurrence of a short circuit due to shrinkage of the shutdown layer when the temperature in the battery becomes high. Needless to say, the thermal shrinkage ratio is preferably as small as possible, and particularly preferably 0%.

By ensuring the above thermal shrinkage ratio, the separator can be maintained to have a width larger than, e.g., the width of the negative electrode at the temperature T when actually incorporated into the battery. Therefore, the occurrence of a short circuit can be sufficiently suppressed.

The average particle size of the heat-resistant fine particles is in the range of preferably 0.3 µm, more preferably 0.4 µm, most preferably 0.5 µm to preferably 1.5 µm, more preferably 1.2 µm, most preferably 1 µm. The average particle size of the heat-resistant fine particles can be defined as a number average particle size that is measured with a laser diffraction particle size analyzer (e.g., LA-920 manufactured by Horiba, Ltd.) by dispersing the heat-resistant fine particles in a medium, in which the particles are insoluble.

The heat-resistant fine particles can have any shape such as a sphere (true sphere or substantial sphere), a rugby ball, a polyhedron, or a plate-like particle. However, it is more preferable that the heat-resistant fine particles are in the form of plate-like particles. The use of plate-like particles as the heat-resistant fine particles makes it easier to form a heat-resistant layer that is less susceptible to thermal shrinkage. Therefore, even if the separator has a structure in which the heat-resistant layer is integrated with the shutdown layer that is a porous film made of a thermoplastic resin, thermal shrinkage of the whole separator caused by thermal shrinkage of the shutdown layer can be effectively suppressed. For example, the thermal shrinkage ratio of the separator can be 5% or less at 165° C., which is measured by a method as will be described later. Although the reason the thermal shrinkage of the separator or the heat-resistant layer is easily suppressed by using the heat-resistant fine particles in the form of plate-like particles is not clear, it is considered that the plane surfaces of the individual particles are likely to be oriented in the direction parallel to the plane direction of the separator, and the particles are more closely packed because of such orientation, thereby resisting the shrinkage.

In the present specification, the thermal shrinkage ratios of the separator and the heat-resistant layer are determined in the following manner. The separator or the heat-resistant layer is cut into 3 cm×3 cm, and then interposed between two glass plates, each of which has a thickness of 5 mm. This sample is allowed to stand in a thermostatic bath at a predetermined temperature for 1 hour and heated. Subsequently, dimensional changes of the sample are measured. That is, the thermal shrinkage ratio is defined as a ratio of decrease in the width of the separator after heating to that of the separator at room temperature before heating. When the thermal shrinkage ratio involves directivity, it is defined as a ratio of decrease in the width of the separator in the direction in which the separator shrinks the most.

In the present invention, it is preferable that the heat-resistant layer includes a binder to integrate the heat-resistant layer with the shutdown layer or the electrode, or to bind the heat-resistant fine particles constituting the heat-resistant layer. Examples of the binder include the following: an ethylene-vinyl acetate copolymer (EVA having 20 to 35 mol % of a structural unit derived from vinyl acetate); an ethylene-acrylic acid copolymer such as an ethylene-ethyl acrylate copolymer (EEA); fluoro-rubber; styrene-butadiene rubber (SBR); carboxymethyl cellulose (CMC); hydroxyethyl cellulose (HEC); polyvinyl alcohol (PVA); polyvinyl butyral (PVB); polyvinyl pyrrolidone (PVP); poly-N-vinylacetamide; a cross-linked acrylic resin; polyurethane; and an epoxy resin. The above examples of the binder may be used individually or in combinations of two or more.

Among the above binders, the heat-resistant resins having heat resistance at 150° C. or higher are suitable. In particular, highly flexible materials such as the ethylene-acrylic acid copolymer, the fluoro-rubber, and the SBR are more suitable. Specific examples of the highly flexible materials include the following: EVA, "EVAFLEX series (trade mane)" manufactured by DU PONT-MITSUI POLYCHEMICALS CO., LTD.; EVA manufactured by NIPPON UNICAR CO., LTD.; an ethylene-acrylic acid copolymer, "EVAFLEX-EEA series (trade name)" manufactured by DU PONT-MITSUI POLYCHEMICALS CO., LTD.; EEA manufactured by NIPPON UNICAR CO., LTD.; fluoro-rubber, "DAI-EL LATEX series (trade name)" manufactured by DAIKIN INDUSTRIES, Ltd.; SBR, "TRD-2001 (trade name)" manufactured by JSR Corporation; and SBR, "EM-400B (trade name)" manufactured by ZEON CORPORATION. Moreover, the cross-linked acrylic resin (self-cross-linking acrylic resin) that has a low glass transition temperature is also suitable, and includes butyl acrylate as the main component and has cross-linking of the butyl acrylate.

When the binder is used, it may be dissolved or emulsified in a medium (solvent) of a composition (slurry etc.) for forming the heat-resistant layer, as will be described later.

The heat-resistant layer may further include a porous base material as long as the heat resistance is not impaired. The porous base material may be, e.g., a porous film made of a heat-resistant resin, or a woven or nonwoven fabric made of heat-resistant fibers. Examples of the constituents of the porous base material includes the following: cellulose and a modified product of the cellulose such as carboxymethyl cellulose; polypropylene (PP); polyesters such as polyethylene terephthalate (PET), polyethylene naphthalate (PEN), and polybutylene terephthalate (PBT); resins such as polyacrylonitrile (PAN), aramid, amide-imide, and polyimide; and inorganic materials (inorganic oxides) such as glass, alumina, and silica. The porous base material may include either one type or more than one type of these constituents. The porous base material also may include various types of additives (e.g., an antioxidant when the resin is used) as needed in addition to the above constituents.

The content of the heat-resistant fine particles in the heat-resistant layer is preferably 20 vol % or more, more preferably 50 vol % or more, and further preferably 80 vol % or more of the total volume of components in the heat-resistant layer. By increasing the content of the heat-resistant fine particles in the heat-resistant layer, thermal shrinkage of the heat-resistant layer or the whole separator can be favorably suppressed. As described above, the heat-resistant layer preferably includes a binder. In view of this, the preferred upper limit of the content of the heat-resistant fine particles in the heat-resistant layer is, e.g., 99 vol % of the total volume of components in the heat-resistant layer. If the content of the heat-resistant fine particles in the heat-resistant layer is too small, e.g., the content of the binder in the heat-resistant layer should be increased. In such a case, however, the pores of the heat-resistant layer are filled with the binder, which may impair, e.g., the function of the separator. On the other hand, if a hole-opening agent or the like is used to provide a porous heat-resistant layer, the space between the heat-resistant fine particles becomes extremely large, so that the effect of suppressing thermal shrinkage may be reduced.

The content of the binder in the heat-resistant layer is preferably 1 to 20 vol % of the total volume of components in the heat-resistant layer.

When the heat-resistant layer includes the porous base material composed of the heat-resistant resin or the heat-resistant fibers, the content of the heat-resistant resin or the heat-resistant fibers of the porous base material in the heat-resistant layer is in the range of preferably 10 vol %, more preferably 30 vol % to preferably 90 vol %, more preferably 70 vol % of the total volume of components in the heat-resistant layer.

The material of the shutdown layer of the separator is not particularly limited as long as it is a thermoplastic resin that is electrochemically stable, also stable to the nonaqueous electrolyte of the battery, and preferably able to ensure the shutdown temperature. In particular, polyolefin (polyethylene, polypropylene, an ethylene-propylene copolymer, etc.) having a softening point (melting point, glass transition point, etc.) of 100 to 150° C. is suitable. Moreover, polyester also can be used.

The shutdown layer may be in any form as long as it has sufficient ionic conductance to obtain necessary battery characteristics. As the shutdown layer, porous films can be used, including a porous film that is formed by aggregating fine particles and an ion-permeable porous film (microporous film) that has many pores and is formed by a conventional solvent extraction method, a dry or wet drawing method, or the like. More specifically, a polyethylene porous film, a polypropylene porous film, a polyester porous film, etc. are suitable for the shutdown layer.

When the shutdown layer is formed, e.g., by aggregating thermoplastic resin fine particles, the shutdown layer may include a binder as needed to bind the fine particles or to integrate the shutdown later with the heat-resistant layer or the electrode. The various types of binders that may be included in the heat-resistant layer also can be used for the shutdown layer. These binders may be used individually or in combinations of two or more. Like the heat-resistant layer, when the binder is used, it may be dissolved or emulsified in a medium (solvent) of a composition (slurry etc.) for forming the shutdown layer, as will be described later.

When the shutdown layer includes the binder, it is preferable that the content of the thermoplastic resin fine particles is 70 to 99 vol % of the total volume of components in the shutdown layer, and the content of the binder is 1 to 30 vol % of the total volume of components in the shutdown layer.

Although the separator can have one heat-resistant layer and one shutdown layer, it may have a plurality of heat-resistant layers that are disposed, e.g., on both sides of the shutdown layer or a plurality of shutdown layers. However, the thickness of the separator increases with the number of layers, which may lead to an increase in the internal resistance or a reduction in the energy density. Therefore, the separator should not include too many layers, and the total number of layers (the heat-resistant layer and the shutdown layer) constituting the separator is preferably five layers or less, and more preferably two layers.

When the separator has a multilayer structure of the heat-resistant layer and the shutdown layer, the heat-resistant layer may be integrated with the shutdown layer. Alternatively, the heat-resistant layer and the shutdown layer are not integrated, but may be provided as independent films, or the heat-resistant layer or the shutdown layer may be individually integrated with the electrode. When the heat-resistant layer and the shutdown layer are not integrated, the separator may be configured by laminating the heat-resistant layer and the shutdown layer together in the nonaqueous electrolyte battery.

In terms of isolating the positive electrode from the negative electrode more reliably, the thickness of the separator is preferably 6 μm or more, and more preferably 10 μm or more. On the other hand, if the separator is too thick, the energy density of the battery may be reduced. Therefore, the thickness of the separator is preferably 50 μm or less, and more preferably 30 μm or less.

When the thicknesses of the shutdown layer and the heat-resistant layer of the separator are represented by A (μm) and B (μm), respectively, the ratio A/B of A to B is in the range of preferably ¼, more preferably ½ to preferably 5, more preferably 4. As described above, in the separator of the present invention, even if the thickness ratio is increased by reducing the thickness of the heat-resistant layer, the occurrence of a short circuit due to thermal shrinkage of the separator can be highly suppressed in the nonaqueous electrolyte battery. When the separator has a plurality of shutdown layers, A represents the total thickness of the plurality of shutdown layers. When the separator has a plurality of heat-resistant layers, B represents the total thickness of the plurality of heat-resistant layers.

Specific values of A and B are as follows. The thickness of the shutdown layer (the total thickness in the case of a plurality of shutdown layers) is preferably 5 μm to 30 μm. The thickness of the heat-resistant layer (the total thickness in the case of a plurality of heat-resistant layers) is in the range of preferably 1 μm, more preferably 2 μm, even more preferably 4 μm to preferably 20 μm, more preferably 10 μm. If the shutdown layer is too thin, the shutdown property may be weakened. If the shutdown layer is too thick, the energy density of the battery may be reduced, and also the effect of suppressing thermal shrinkage of the whole separator may be reduced because the force of the thermal shrinkage is increased when the separator has a structure in which the heat-resistant layer is integrated with the shutdown layer.

Moreover, if the heat-resistant layer is too thin, the function of isolating the positive electrode from the negative electrode at high temperatures may be reduced, and also the effect of suppressing thermal shrinkage of the whole separator may be reduced when the separator has a structure in which the heat-resistant layer is integrated with the shutdown layer. If the heat-resistant layer is too thick, the thickness of the whole separator is increased.

The average pore diameter of the separator is in the range of preferably 0.01 μm, more preferably 0.05 μm to preferably 1 μm, more preferably 0.5 μm. The average pore diameter of the shutdown layer is preferably 0.01 to 5 μm. The average pore diameter of the heat-resistant layer is preferably 0.05 to 1 μm. In the case of the battery that includes a wound electrode body obtained by winding the positive electrode and the negative electrode via the separator in a spiral fashion, the separator is bent while the electrode body is wound, and thus can cause a crack or the like in the heat-resistant layer. However, when the separator has the above average pore diameter (particularly, the shutdown layer has the above average pore diameter), even if the heat-resistant layer has a crack or the like, it is possible to prevent lithium dendrites from passing through the crack of the heat-resistant layer. In the case of the battery that includes a so-called laminated electrode body obtained by laminating the positive electrode, the negative electrode, and the separator, instead of the wound electrode body, the average pore diameters of the separator, the shutdown layer, and the heat-resistant layer do not have to meet the above suitable values, but more preferably fall in the respective ranges.

In terms of improving the ion permeability by ensuring the retention of the nonaqueous electrolyte, the porosity of the whole separator is preferably 30% or more in a dry state. On the other hand, in terms of ensuring the strength of the separator and preventing an internal short circuit, the porosity of the whole separator is preferably 70% or less in a dry state. The porosity P (%) of the separator can be calculated from the thickness of the separator, the mass per unit area of the separator, and the densities of the components of the separator by obtaining a summation for each component i with the following formula (1).

$$P = 100 - (\Sigma a_i / \rho_i) \times (m/t) \qquad (1)$$

where $a_i$ represents the ratio of a component i expressed as a mass percentage, $\rho_i$ represents the density (g/cm$^3$) of the component i, m represents the mass (g/cm$^2$) per unit area of the separator, and t represents the thickness (cm) of the separator.

In the formula (1), when m represents the mass (g/cm$^2$) per unit area of the shutdown layer and t represents the thickness (cm) of the shutdown layer, the porosity P (%) of the shutdown layer can be determined. The porosity of the shutdown layer obtained in this manner is preferably 30 to 70%.

In the formula (1), when m represents the mass (g/cm$^2$) per unit area of the heat-resistant layer and t represents the thickness (cm) of the heat-resistant layer, the porosity P (%) of the heat-resistant layer also can be determined. The porosity of the heat-resistant layer obtained in this manner is preferably 20 to 60%.

It is desirable that the separator of the present invention has an air permeability of 30 to 300 sec, which is indicated by the Gurley value. The Gurley value is obtained by a method according to JIS P 8117 and expressed as the length of time (seconds) it takes for 100 ml air to pass through a membrane at a pressure of 0.879 g/mm$^2$. If the air permeability is too large, the ion permeability can be reduced. On the other hand, if the air permeability is too small, the strength of the separator can be reduced. It is desirable that the strength of the separator is penetrating strength measured using a 1 mm diameter needle, and that the penetrating strength is 50 g or more. If the penetrating strength is too small, lithium dendrite crystals may penetrate the separator when they are produced, thus leading to a short circuit. The separator having the multilayer structure as described above can ensure the air permeability and the penetrating strength.

The separator of the present invention can be produced in the following manner. For example, the heat-resistant fine particles, the binder, etc. constituting the heat-resistant layer are dispersed in a dispersion medium, namely an organic solvent such as water or N-methyl-2-pyrrolidone (NMP) to prepare a slurry or paste-like composition for forming the heat-resistant layer (the binder may be dissolved in the dispersion medium). This composition is applied to the surface of the shutdown layer and dried.

When the shutdown layer is a microporous film made of a thermoplastic resin, the composition for forming the heat-resistant layer can be applied to the surface of the shutdown layer, e.g., by coating the surface of the microporous film with the composition using a coater or by immersing the microporous film in the composition.

When the shutdown layer is composed of aggregated thermoplastic resin fine particles, the thermoplastic resin fine particles, the binder used as needed, etc. constituting the shutdown layer are dispersed in a dispersion medium such as water or an organic solvent to prepare a slurry or paste-like composition for forming the shutdown layer (the binder may be dissolved in the dispersion medium). This composition is applied to a substrate and dried, so that a shutdown layer is formed beforehand. Subsequently, the composition for forming the heat-resistant layer can be applied to the surface of this shutdown layer in the same manner as the microporous film. The separator also can be produced in a manner contrary to the above. That is, the composition for forming the heat-resistant layer is applied to a substrate and dried, so that a heat-resistant layer is formed beforehand. Subsequently, the composition for forming the shutdown layer is applied to the surface of this heat-resistant layer and dried.

The heat-resistant layer and the shutdown layer can be simultaneously formed by applying one of the compositions for forming the heat-resistant layer and the shutdown layer to a substrate, and then applying the other composition before the previously applied composition is completely dried.

When the heat-resistant layer includes the porous base material, the composition for forming the heat-resistant layer may be applied to the porous base material or the porous base material may be immersed in the composition, and then the composition is dried to form the heat-resistant layer.

As described above, the heat-resistant layer and the shutdown layer are not necessarily integrated, but can be independent of each other and laminated together in the battery. Moreover, one or both of the heat-resistant layer and the shutdown layer may be integrated with the electrode (positive electrode or negative electrode). To integrate the heat-resistant layer or the shutdown layer with the electrode, e.g., the heat-resistant layer or the shutdown layer serving as an independent film can be laminated with the electrode, or the composition for forming the heat-resistant layer or the shutdown layer can be applied to the electrode, thereby forming the heat-resistant layer or the shutdown layer. It is preferable that the heat-resistant layer is integrated with the shutdown layer because a conventional manufacturing process can be used to produce a battery.

The negative electrode of the battery of the present invention is not particularly limited as long as it can be used for the nonaqueous electrolyte battery. Examples of the negative active material include mixtures of two or more carbon materials capable of intercalating and deintercalating lithium such as graphite, pyrolytic carbon, coke, glassy carbon, a calcined organic polymer compound, mesocarbon microbeads, and a carbon fiber. Moreover, examples of the negative active material also include the following: alloys of Si, Sn, Ge, Bi, Sb, and In; compounds that can be charged/discharged at a low voltage close to lithium metal such as a lithium-containing nitride and a lithium-containing oxide; a lithium metal; and a Li/Ai alloy. The negative electrode may be produced in such a manner that a negative electrode mixture is obtained by adding the conductive assistant or the binder (e.g., PVDF) appropriately to the negative active material, and then formed into a compact (a negative electrode mixture layer) while a current collector such as a copper foil is used as a core material. Alternatively, foils of the above alloys or lithium metal can be used individually or in the form of a laminate with the current collector (e.g., a copper foil) as the negative electrode.

When the negative electrode of the present invention includes a current collector, the current collector may be, e.g., a foil, a punched metal, a mesh, or an expanded metal, which are made of copper, nickel, or the like. In general, a cooper foil is used. If the thickness of the whole negative electrode is reduced to achieve a battery with high energy density, the current collector of the negative electrode preferably has a thickness of 5 to 30 µm.

A lead portion of the negative electrode is generally provided in the following manner. A part of the current collector remains exposed without forming the negative electrode mixture layer when the negative electrode is produced, and this exposed portion can serve as the lead portion. However, the lead portion does not necessarily need to be integrated with the current collector from the beginning and may be provided by connecting a copper foil or the like to the current collector afterward.

The nonaqueous electrolyte of the present invention can be a nonaqueous electrolyte (nonaqueous electrolytic solution) produced by dissolving at least one lithium salt selected from the group consisting of $LiClO_4$, $LiPF_6$, $LiBF_4$, $LiAsF_6$, $LiSbF_6$, $LiCF_3SO_3$, $LiCF_3CO_2$, $Li_2C_2F_4(SO_3)_2$, $LiN(CF_3SO_2)_2$, $LiC(CF_3SO_2)_3$, $LiCriF_{2n+1}SO_3$ ($2 \leq n \leq 5$), and $LiN(RfOSO_2)_2$ (where Rf represents a fluoroalkyl group) in an organic solvent such as a dimethyl carbonate, a diethyl carbonate, a methyl ethyl carbonate, methyl propionate, an ethylene carbonate, a propylene carbonate, a butylene carbonate, γ-butyrolactone, ethylene glycol sulfite, 1,2-dimethoxyethane, 1,3-dioxolane, tetrahydrofuran, 2-methyltetrahydrofuran, or diethyl ether. The concentration of the lithium salt in the electrolyte is preferably 0.5 to 1.5 mol/l, and more preferably 0.9 to 1.25 mol/l.

The nonaqueous electrolyte battery of the present invention may be in the form of a rectangular or circular cylinder and have an outer can made of steel or aluminum. Moreover, the nonaqueous electrolyte battery may be a soft package battery using a metal-deposited laminated film as an outer package.

The electrode used in the nonaqueous electrolyte battery of the present invention may be in the form of a laminated electrode body obtained by laminating the positive electrode and the negative electrode via the separator of the present invention or in the form of a wound electrode body obtained by winding the laminated electrode body. In this case, since the thermal shrinkage of a conventional separator is large in the width direction, the width $W_s$ of the separator needs to be much larger than the width $W_a$ of the negative electrode to prevent a short circuit at high temperatures. On the other hand, the thermal shrinkage of the separator of the present invention in the width direction can be sufficiently suppressed even if the heat-resistant layer is integrated with the shutdown layer to form the separator. Therefore, in the above wound electrode body, a short circuit due to contact between the positive electrode and the negative electrode can be prevented only by making the width $W_s$ of the separator slightly larger than the width $W_a$ of the negative electrode.

When the shutdown layer is made of a material having somewhat inferior resistance to oxidation such as polyolefin, it is desirable to avoid contact between the shutdown layer and the positive active material so as to prevent degradation of the separator caused by oxidation and improve the charge-discharge cycle life and the high-temperature storage characteristics of the battery. In particular, when the charging potential is 4.3 V or more, the oxidation action becomes prominent. Moreover, when the shutdown layer is located on the negative electrode side, particularly is brought into contact with the negative electrode mixture layer, a film of the thermoplastic resin of the shutdown layer is formed on the surface of the negative electrode mixture layer after a shutdown is effected. This can suppress a reaction between the air that flows into the battery, e.g., after a cleavable vent has opened (as will be described later) and the negative active material, and thus can further improve the safety at high temperatures.

Figure 1B:
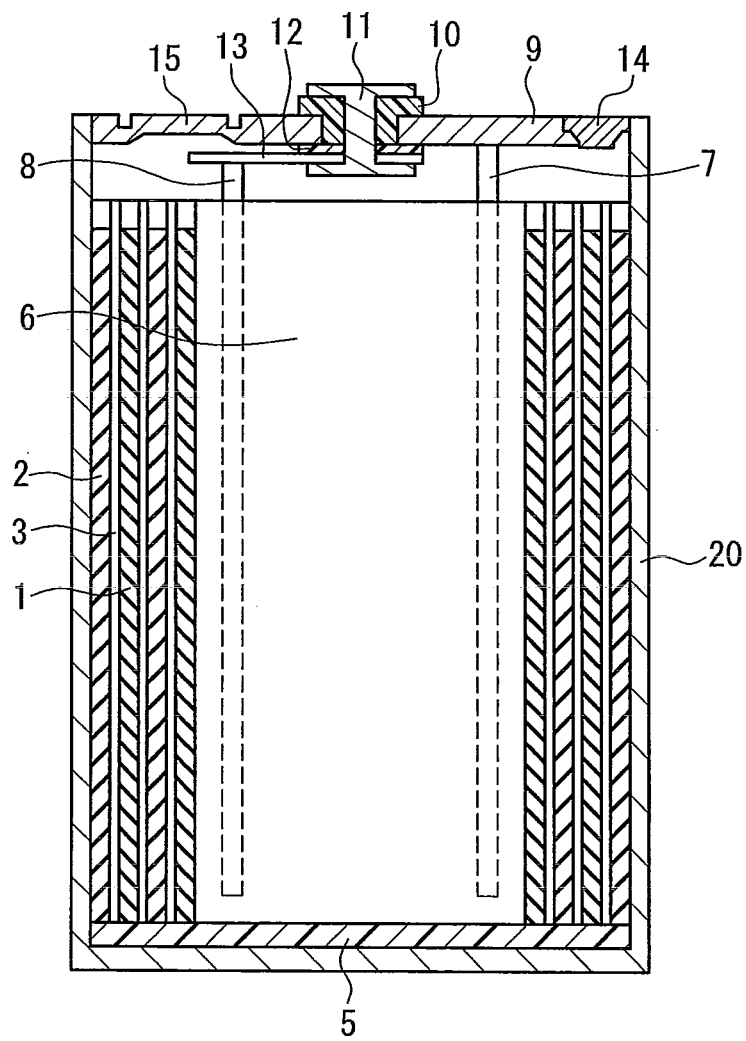
FIG. 1B is a schematic cross-sectional view of a nonaqueous electrolyte battery of the present invention.
Figure 2:
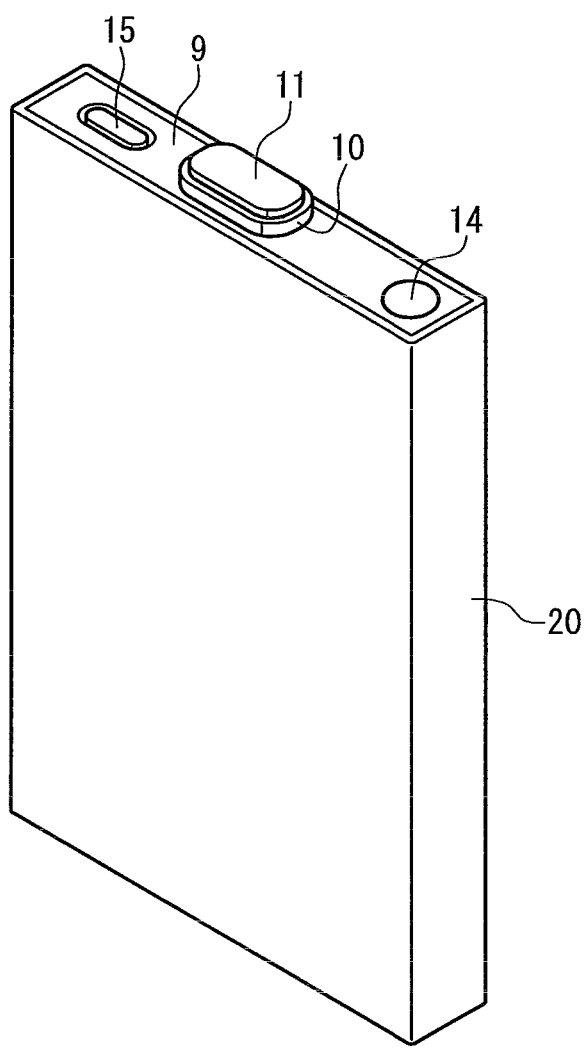
FIG. 2 is schematic diagram showing the appearance of a nonaqueous electrolyte battery of the present invention.

Hereinafter, an example of the nonaqueous electrolyte battery of the present invention will be described with reference to the drawings. FIG. 1A is a schematic plan view of the nonaqueous electrolyte battery of the present invention. FIG. 1B is a schematic cross-sectional view of the nonaqueous electrolyte battery of the present invention. FIG. 2 is a schematic diagram showing the appearance of the nonaqueous electrolyte battery of the present invention.

In the battery shown in FIGS. 1A, 1B, and 2, a negative electrode 1 and a positive electrode 2 are wound via a separator 3 of the present invention in a spiral fashion, and then pressed into a flat shape, thereby providing a wound electrode body 6. The wound electrode body 6, together with a non-aqueous electrolyte, is housed in a rectangular cylindrical outer can 20. For the sake of simplicity, FIG. 1B does not illustrate a metal foil that is a current collector of the negative electrode 1 or the positive electrode 2, a nonaqueous electrolyte, etc. and also does not show hatching that indicates the cross sections of the center of the wound electrode body 6 and the separator 3.

The outer can 20 is made of an aluminum alloy, serves as an outer package of the battery, and is also used as a positive terminal. An insulator 5 made of a polyethylene sheet is placed at the bottom of the outer can 20. A negative electrode lead 8 and a positive electrode lead 7 connected to the respective ends of the negative electrode 1 and the positive electrode 2 are drawn from the wound electrode body 6 including the negative electrode 1, the positive electrode 2, and the separator 3. A stainless steel terminal 11 is attached to a cover 9 via a polypropylene insulating packing 10. The cover 9 is made of an aluminum alloy and used to seal the opening of the outer can 20. A stainless steel lead plate 13 is connected to the terminal 11 via an insulator 12.

The cover 9 is inserted in the opening of the outer can 20, and the joint between them is welded to seal the opening, so that the inside of the battery is hermetically sealed. Moreover, the cover 9 has an inlet 14 through which the nonaqueous electrolyte is injected. The inlet 14 is sealed with a sealing member by laser welding or the like. Thus, the sealing properties of the battery are ensured. For convenience, in FIGS. 1A, 1B, and 2, the inlet 14 includes the sealing member as well as itself. The cover 9 has a cleavable vent 15 as a mechanism for discharging the gas contained in the battery to the outside at the time the internal pressure is raised due to a rise in temperature or the like.

In the nonaqueous electrolyte battery shown in FIGS. 1A, 1B, and 2, the positive electrode lead 7 is directly welded to the cover 9, so that the outer can 20 and the cover 9 can function as a positive terminal. Moreover, the negative electrode lead 8 is welded to the lead plate 13, and thus electrically connected to the terminal 11 via the lead plate 13, so that the terminal 11 can function as a negative terminal. However, the positive and negative electrodes may be reversed depending on the material of the outer can 20 or the like.

The nonaqueous electrolyte battery of the present invention can be used in the same application as that of a conventional nonaqueous electrolyte battery.

Next, the present invention will be described in detail by way of examples. However, the present invention is not limited to the following examples.

Example 1

Production of Positive Electrode

A positive electrode mixture containing paste was prepared by mixing 90 parts by mass of $LiCo_{0.33}Ni_{0.33}Mn_{0.33}O_2$ (positive active material), 7 parts by mass of acetylene black (conductive assistant), and 3 parts by mass of PVDF (binder) uniformly by using NMP as a solvent. This paste was intermittently applied to both surfaces of a current collector (aluminum foil) with a thickness of 15 μm so that the applied length was 280 mm on the upper surface and 210 mm on the lower surface, which then was dried and calendered. Thus, the thicknesses of the positive electrode mixture layers were adjusted so that the total thickness was 150 μm. Subsequently, this current collector having the positive electrode mixture layers was cut into a length of 300 mm and a width of 43 mm, thereby producing a positive electrode. Moreover, a lead portion was formed by welding a tab to the exposed portion of the aluminum foil of the positive electrode.

<Production of Negative Electrode>

A negative electrode mixture containing paste was prepared by mixing 95 parts by mass of graphite (negative active material) and 5 parts by mass of PVDF (binder) uniformly by using NMP as a solvent. This paste was intermittently applied to both surfaces of a current collector (copper foil) with a thickness of 10 μm so that the applied length was 290 mm on the upper surface and 230 mm on the lower surface, which then was dried and calendered. Thus, the thicknesses of the negative electrode mixture layers were adjusted so that the total thickness was 142 μm. Subsequently, this current collector having the negative electrode mixture layers was cut into a length of 300 mm and a width of 45 mm, thereby producing a negative electrode. Moreover, a lead portion was formed by welding a tab to the exposed portion of the copper foil of the negative electrode.

<Production of Separator>

200 g of an emulsion of a self-cross-linking acrylic resin serving as a binder (with a solid content of 40 mass %) and 4000 g of water were put in a container and stirred at room temperature until the binder was uniformly dissolved in water. Then, 4000 g of a plate-like boehmite powder serving as heat-resistant fine particles (an average particle size: 1 μm, a proportion of particles with a particle size of 0.2 μm or less: 0 vol %, a proportion of particles with a particle size of 2 μm or more: 4 vol %, and an aspect ratio: 10) was added to this solution at four different times, and dispersed with a Disper at 2800 rpm for 5 hours, resulting in a uniform slurry. Next, the slurry was applied to a polyethylene microporous film (with a thickness of 16 µm, a porosity of 40%, an average pore diameter of 0.02 µm, and a melting point of 135° C.) using a micro-gravure coater and dried, so that cross-links were formed by the acrylic resin. Thus, a separator that had a thickness of 20 µm and included a heat-resistant layer containing boehmite and a shutdown layer formed of the polyethylene microporous film (with a melting point of 135° C.) was produced. Then, the separator was cut into a width of 47 mm and used to produce a battery.

<Production of Battery>

The positive electrode and the negative electrode were laminated with the separator interposed between them so that the shutdown layer faced the negative electrode, and then wound in a spiral fashion to form a wound electrode body. Next, the wound electrode body was pressed into a flat shape and placed in an aluminum rectangular outer can with a thickness of 4 mm, a height of 50 mm, and a width of 34 mm. Moreover, a nonaqueous electrolyte (obtained by dissolving $LiPF_6$ at a concentration of 1.2 mol/l in a solvent containing an ethylene carbonate and an ethyl methyl carbonate at a volume ratio of 1:2) was injected, and the outer can was sealed in a vacuum, resulting in a nonaqueous electrolyte battery.

Example 2

A positive electrode was produced in the same manner as Example 1 except that the positive active material was changed to $LiMn_{1.9}Al_{0.1}O_4$.

The same slurry as that in Example 1 was applied to the surface of a PET nonwoven fabric (with a thickness of 15 µm and a weight of 10 g/m$^2$) using a dip coater and dried, thereby providing a heat-resistant layer with a thickness of 18 µm. Then, a water dispersion of polyethylene fine particles (with an average particle size of 1 µm, a melting point of 125° C., and a solid content of 20 mass %) was applied to the surface of the heat-resistant layer using a die coater and dried, thereby providing a shutdown layer. Thus, a separator was produced. The thickness of the separator was 23 µm.

A nonaqueous electrolyte battery was produced in the same manner as Example 1 except that the positive electrode and the separator of this example were used.

Example 3

A positive electrode was produced in the same manner as Example 1 except that the positive active material was changed to $LiFePO_4$.

Next, 600 g of an NMP solution of PVDF serving as a binder (with a solid content of 15 mass %) and 1000 g of NMP were put in a container and stirred at room temperature until the solution was uniform. Then, 3000 g of an alumina powder serving as heat-resistant fine particles (an average particle size: 0.4 µm, a proportion of particles with a particle size of 0.2 µm or less: 0 vol %, and a proportion of particles with a particle size of 2 µm or more: 0 vol %) was added to this solution at four different times, and dispersed with a Disper at 2800 rpm for 1 hour, resulting in a uniform slurry. Next, the slurry was applied to the surface of the above positive electrode using a die coater and dried, thereby providing a heat-resistant layer with a thickness of 4 µm.

A nonaqueous electrolyte battery was produced in the same manner as Example 1 except that the above positive electrode including the heat-resistant layer, the same negative electrode as that prepared in Example 1, and a polyethylene microporous film with a thickness of 16 µm were used, and a wound electrode body was formed so that the polyethylene microporous film was located between the heat-resistant layer of the positive electrode and the negative electrode. In this example, the heat-resistant layer formed on the surface of the positive electrode and the polyethylene microporous film (shutdown layer) corresponded to the separator.

Example 4

Production of Negative Electrode

A negative electrode with a length of 510 mm and a width of 45 mm was produced in the same manner as Example 1 except that the negative electrode mixture containing paste was intermittently applied so that the applied length was 500 mm on the upper surface and 440 mm on the lower surface.

<Production of Positive Electrode>

90 parts by mass of $LiNi_{0.65}Mn_{0.15}Cu_{0.2}O_2$ (with a number average particle size of 17 µm) and 10 parts by mass of $LiCoO_2$ (with a number average particle size of 5 µm) were dry-mixed, to which 20 parts by mass of an NMP solution including 10 mass % of PVDF serving as a binder were added, and then further mixed. Next, 1 part by mass of artificial graphite and 1 part by mass of Ketjenblack were added to this mixture as a conductive assistant and kneaded with a two-axis kneader. Moreover, NMP was added to adjust the viscosity of the mixture, and thus a positive electrode mixture containing paste was prepared. A positive electrode with a length of 520 mm and a width of 43 mm was produced in the same manner as Example 1 except that the positive electrode mixture containing paste was intermittently applied so that the applied length was 500 mm on the upper surface and 425 mm on the lower surface.

<Production of Separator>

A separator with a thickness of 22 µm was produced in the same manner as Example 1 except that 200 g of the emulsion of the self-cross-linking acrylic resin were changed to 100 g of an emulsion of SBR (with a solid content of 40 mass %). The volume ratio of the heat-resistant fine particles to the heat-resistant layer of the separator was 91 vol %, and the porosity of the heat-resistant layer was 48%.

<Production of Battery>

A nonaqueous electrolyte battery was produced in the same manner as Example 1 except that an aluminum rectangular outer can with a thickness of 6 mm, a height of 50 mm, and a width of 34 mm was used.

Comparative Example 1

A nonaqueous electrolyte battery was produced in the same manner as Example 1 except that the separator was changed to a polyethylene microporous film with a thickness of 16 µm.

Comparative Example 2

A nonaqueous electrolyte battery was produced in the same manner as Example 1 except that the positive active material was changed to $LiCoO_2$.

Comparative Example 3

A nonaqueous electrolyte battery was produced in the same manner as Example 1 except that the separator was changed to a PET nonwoven fabric (with a thickness of 15 µm and a weight of 10 g/m$^2$).

[Measurement of Heat Generation Starting Temperature of Positive Electrode]

The heat generation starting temperature of the positive electrode in each of the nonaqueous electrolyte batteries of Examples 1 to 4 and Comparative Examples 1 to 3 was measured using a DSC "Pyris 1" manufactured by PerkinElmer Co., Ltd. Each of the nonaqueous electrolyte batteries charged to 4.25 V was disassembled in a glove box having an Ar atmosphere, and the positive electrode was taken out and punched into a circular shape with a diameter of 3.5 mm. This positive electrode was weighed and then sealed in a sample pan that had a gold-plated surface and was able to withstand 150 atm. Next, the temperature was raised from 30 to 400° C. at 10° C./min, and a DSC curve was obtained. In the DSC curve, the heat generation starting temperature of the positive electrode indicated a temperature at an intersection point of two lines: one is an extension line of the base line on the high temperature side; and the other is a tangent to the curve of the exothermic peak on the low temperature side at a point where the curve has the maximum slope. Table 1 shows the results.

[Measurement of Thermal Shrinkage Ratio at T° C.]

The separator used in each of the nonaqueous electrolyte batteries of Examples 1 to 4 and Comparative Examples 1 to 3 was allowed to stand in a thermostatic bath at T° C. that was 10° C. lower than the heat generation starting temperature of the positive electrode (where the upper limit of T was 200° C.) for 1 hour. Then, the thermal shrinkage ratio of the separator was measured by the above-described method. Table 1 shows the results along with T° C.

[Measurement of Shutdown Temperature]

The separator used in each of the nonaqueous electrolyte batteries of Examples 1 to 4 and Comparative Examples 1 to 2 was placed in a thermostatic bath and heated by raising the temperature from 100° C. in 5° C. increments for 10 minutes, and subsequently the Gurley value was measured. Next, changes in the Gurley value before and after the heating of the separator in the thermostatic bath were determined, and a temperature at which the Gurley value was at least ten times larger than that before heating was defined as the shutdown temperature. The Gurley value was obtained by a method according to JIS P 8117 and expressed as the length of time (seconds) it took for 100 ml air to pass through a membrane at a pressure of 0.879 g/mm².

With respect to the separator of Example 3, the thermal shrinkage ratio and the change of the Gurley value were determined for each of the heat-resistant layer and the polyethylene microporous film used in Example 3. In this case, the heat-resistant layer was prepared in the following manner. The slurry for forming the heat-resistant layer was applied to a PET film, which had been subjected to a peeling treatment, and dried to form a heat-resistant layer. Then, this heat-resistant layer was removed from the PET film. Comparing the heat-resistant layer and the polyethylene microporous film, a smaller value of the thermal shrinkage ratios and a larger value of the changes in the Gurley value were selected as the thermal shrinkage ratio and the shutdown temperature of the separator of Example 3, respectively.

Table 1 also shows the width of each of the separators after the thermal shrinkage at T° C. in Examples 1, 2, and 4 and Comparative Examples 1 to 3, and the width of the heat-resistant layer after the thermal shrinkage at T° C. in Example 3.

TABLE 1

|  | Heat generation starting temperature of positive electrode (° C.) | Shutdown temperature (° C.) | T ° C. | Thermal shrinkage ratio at T ° C. (%) | Width of separator or heat-resistant layer at T ° C. (mm) |
| --- | --- | --- | --- | --- | --- |
| Example 1 | 229 | 135 | 200 | 2 | 46.1 |
| Example 2 | 200 | 135 | 190 | 0 | 47 |
| Example 3 | 229 | 135 | 200 | 0 | 47 |
| Example 4 | 220 | 135 | 200 | 1 | 46.5 |
| Comparative Example 1 | 229 | 140 | 200 | 35 | 30.6 |
| Comparative Example 2 | 161 | 135 | 151 | 1 | 46.5 |
| Comparative Example 3 | 229 | — | 200 | 0 | 47 |

As can be seen from Table 1, the heating characteristics of all the batteries of Examples 1 to 4 were satisfactory. On the other hand, the battery of Comparative Example 1 used the separator including no heat-resistant fine particle, and therefore the thermal shrinkage ratio was 35% at T° C., and the width of the separator was smaller than 45 mm, which was the width of the negative electrode. In the battery of Comparative Example 2, the heat generation starting temperature of the positive electrode was below 180° C. Moreover, the battery of Comparative Example 3 used the separator including no thermoplastic resin, and therefore a shutdown was not effected.

[Evaluation of Charge-Discharge Characteristics]

The nonaqueous electrolyte batteries of Examples 1 to 4 and Comparative Examples 1 to 3 were initially charged by performing a constant-current and constant-voltage charge so that a constant-current charge was performed at a current value of 150 mA at 25° C. until the voltage reached 4.2 V, and subsequently a constant-voltage charge was performed at a voltage of 4.2 V. The duration of the initial charge (i.e., the total charge time) was 12 hours. Next, a constant-current discharge was performed on these batteries at a current value of 150 mA and a final voltage of 3.0 V. Moreover, for each of the discharged batteries, a constant-current and constant-voltage charge was performed (for a duration of 2.5 hours) so that a constant-current charge was performed at a current value of 500 mA until the voltage reached 4.2 V, and subsequently a constant-voltage charge was performed at a voltage of 4.2 V. Further, a constant-current discharge was performed on these batteries at a current value of 500 mA and a final voltage of 3.0 V. Then, the charge/discharge characteristics of each of the batteries were evaluated.

As a result of the evaluation of the charge/discharge characteristics, the batteries of Examples 1 to 4 and Comparative Examples 1 to 2 had good charge/discharge characteristics. However, the battery of Comparative Example 3 caused a short circuit during the initial charge and could not be charged. Therefore, the subsequent evaluation of the battery of Comparative Example 3 ceased.

[Heat Test]

For the nonaqueous electrolyte batteries of Examples 1 to 4 and Comparative Examples 1 to 2, a constant-current and constant-voltage charge was performed in such a manner that each of the batteries was charged at a constant current of 0.2 C until the voltage reached 4.25 V, and subsequently charged at a constant voltage of 4.25 V. The duration of this constant-current and constant-voltage charge was 8 hours. Each of the charged batteries was allowed to stand in a thermostatic bath at 165° C. for 3 hours, and the surface temperature of the battery was observed. Table 2 shows the results.

TABLE 2

|  | Surface temperature of battery after heat test |
|---|---|
| Example 1 | No anomaly |
| Example 2 | No anomaly |
| Example 3 | No anomaly |
| Example 4 | No anomaly |
| Comparative Example 1 | The temperature was raised. |
| Comparative Example 2 | The temperature was raised. |

As can be seen from Table 2, no anomaly was observed in the nonaqueous electrolyte batteries of Examples 1 to 4 during the heat test at 165° C. Accordingly, the batteries of Examples 1 to 4 are superior to the batteries of Comparative Examples 1 to 2 in their safety when allowed to stand at high temperatures.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes that come within the meaning and range of equivalency of the claims are intended to be embraced therein.

INDUSTRIAL APPLICABILITY

As described above, the present invention can provide a battery separator that can constitute a nonaqueous electrolyte battery having excellent safety in a high-temperature environment, and a nonaqueous electrolyte battery using the battery separator.

The invention claimed is:

1. A battery separator comprising:
heat-resistant fine particles; and
a thermoplastic resin,
wherein the heat-resistant fine particles along with a binder constitute a heat-resistant layer,
the thermoplastic resin constitutes a shutdown layer formed of a heat-shrinkable microporous film,
the heat-resistant layer and the shutdown layer are integrated into a multilayer structure,
the shutdown layer has a thickness A (μm) of 5 to 30, the heat-resistant layer has a thickness B (μm) of 1 to 10, a sum of A and B is 6 to 23, and a ratio A/B is 1/2 to 4,
a content of the heat-resistant fine particles in the heat-resistant layer is 50 vol % or more of a total volume of components in the heat-resistant layer,
a proportion of particles with a particle size of 0.2 μm or less in the heat-resistant fine particles is 10 vol % or less and a proportion of particles with a particle size of 2 μm or more in the heat-resistant fine particles is 10 vol % or less, and
a shutdown is effected in a range of 135° C. to 150° C.

2. The battery separator according to claim 1, wherein a thermal shrinkage ratio in a width direction is 10% or less at 200° C.

3. The battery separator according to claim 1, wherein the content of the heat-resistant fine particles in the heat-resistant layer is 80 vol % or more of the total volume of components in the heat-resistant layer.

4. The battery separator according to claim 1, wherein the heat-resistant fine particles are inorganic fine particles.

5. The battery separator according to claim 4, wherein the inorganic fine particles include fine particles of at least one selected from the group consisting of alumina, silica, $BaTiO_3$, boehmite, zeolite, and kaoline.

6. The battery separator according to claim 1, wherein the heat-resistant fine particles include plate-like particles.

7. The battery separator according to claim 1, wherein the heat-resistant layer has a thickness of 2 μm to 6 μm.

8. The battery separator according to claim 1, wherein the thermoplastic resin includes polyolefin.

9. The battery separator according to claim 1, wherein the heat-resistant fine particles have an average particle size of 1.5 μm or less.

10. A nonaqueous electrolyte batter comprising:
a positive electrode having a positive active material capable of intercalating and deintercalating a lithium ion;
a negative electrode having a negative active material capable of intercalating and deintercalating a lithium ion;
a separator interposed between the positive electrode and the negative electrode; and
a nonaqueous electrolyte,
wherein a heat generation starting temperature of the positive electrode is 180° C. or higher, and
wherein the separator is the battery separator according to claim 1.

11. The nonaqueous electrolyte battery according to claim 10, wherein a thermal shrinkage ratio of the separator is 10% or less at a temperature T (° C.) that is 10° C. lower than the heat generation starting temperature of the positive electrode (where an upper limit of T is 200° C.).

12. The nonaqueous electrolyte battery according to claim 10, wherein a width of the separator is larger than that of the negative electrode at a temperature T (° C.) that is 10° C. lower than the heat generation starting temperature of the positive electrode (where an upper limit of T is 200° C.).

13. The nonaqueous electrolyte battery according to claim 10, wherein the positive active material is at least one selected from the group consisting of the following: a spinel-type lithium-containing complex oxide expressed as a general formula $Li_{1+t}Mn_{(2-x)}M^1{}_xO_4$ (where $M^1$ is at least one element selected from the group consisting of Fe, Ni, Mg, Zn, Co, Cr, Al, B, V, Si, Sn, Nb, Ta, Cu, Mo, Ti, and W, $-0.1 \leq t \leq 0.1$, and $0 \leq x \leq 0.6$); an olivine-type lithium-containing complex oxide expressed as a general formula $LiM^2PO_4$ (where $M^2$ is Co, Ni, Mn, or Fe); a lithium-containing complex oxide having a layered crystal structure expressed as a general formula $Li_{(1+a)}M^3{}_{2b}Mn_{(0.5-b)}Ni_{(0.5-b)}O_2$ (where $M^3$ is at least one element selected from the group consisting of Fe, Mg, Zn, Co, Cr, Al, B, V, Si, Sn, Nb, Ta, Cu, Mo, Ti, and W, $-0.1 \ll 0.1$, and $0 \leq b \leq 0.05$); and a lithium-containing complex oxide expressed as a general formula $Li_{(1+y+a)}Ni_{(1-y-z-\delta)/2}Mn_{(1-y-z-\delta)/2}M^4{}_zO_2$ (where $M^4$ is at least one element selected from the group consisting of Ti, Cr, Fe, Co, Cu, Zn, Al, Ge, Sn, Mg, and Zr, $-0.1 \leq y \leq 0.1$, $-0.05 \leq \alpha \leq 0.05$, $0 \leq z < 0.45$, and $-0.24 \leq \delta \leq 0.6$).

14. The nonaqueous electrolyte battery according to claim 10, wherein a content of the heat-resistant fine particles in the heat-resistant layer of the separator is 80 vol % or more of a total volume of components in the heat-resistant layer.

15. The nonaqueous electrolyte battery according to claim 10, wherein the heat-resistant fine particles of the separator are inorganic fine particles.

16. The nonaqueous electrolyte battery according to claim 15, wherein the inorganic fine particles include line particles of at least one selected from the group consisting of alumina, silica, $BaTiO_3$, boehmite, zeolite, and kaoline.

17. The nonaqueous electrolyte battery according to claim 10, wherein the heat-resistant fine particles of the separator include plate-like particles.

18. The nonaqueous electrolyte battery according to claim 10, wherein the heat-resistant layer of the separator has a thickness of 2 μm to 6 μm.

19. The nonaqueous electrolyte battery according to claim 10, wherein the thermoplastic resin of the separator includes polyolefin.

20. The nonaqueous electrolyte battery according to claim 10, wherein the shutdown layer of the separator is located on a negative electrode side.

21. The nonaqueous electrolyte battery according to claim 10, wherein the shutdown layer of the separator is not in contact with the positive active material.

22. The nonaqueous electrolyte battery according to claim 10, wherein the heat-resistant fine particles of the separator have an average particle size of 1.5 μm or less.

23. The battery separator according to claim 1, wherein the shutdown layer has a thickness of 16 μm or less.

24. The battery separator according to claim 1, wherein a content of the binder in the heat-resistant layer is 1 to 20 vol % of a total volume of components in the heat-resistant layer.

25. The battery separator according to claim 1, wherein the binder includes at least one selected from the group consisting of an ethylene-vinyl acetate copolymer (having 20 to 35 mol % of a structural unit derived from vinyl acetate); an ethylene-acrylic acid copolymer; fluoro-rubber; styrene-butadiene rubber; carboxymethyl cellulose; hydroxyethyl cellulose; polyvinyl alcohol; polyvinyl butyral; polyvinyl pyrrolidone; poly-N-vinylacetamide; a cross-linked acrylic resin; polyurethane; and an epoxy resin.

26. The battery separator according to claim 1, wherein the heat-resistant line particles have an average particle size of 0.3 μm or more.

27. The nonaqueous electrolyte battery according to claim 10, wherein the shutdown layer of the separator has a thickness of 16 μm or less.

28. The nonaqueous electrolyte battery according to claim 10, wherein a content of the binder in the heat-resistant layer of the separator is 1 to 20 vol % of a total volume of components in the heat-resistant layer.

29. The nonaqueous electrolyte battery according to claim 10, wherein the binder of the separator includes at least one selected from the group consisting of an ethylene-vinyl acetate copolymer (having 20 to 35 mol % of a structural unit derived from vinyl acetate); an ethylene-acrylic acid copolymer; fluoro-rubber; styrene-butadiene rubber; carboxymethyl cellulose; hydroxyethyl cellulose; polyvinyl alcohol; polyvinyl butyral; polyvinyl pyrrolidone; poly-N-vinylacetamide; a cross-linked acrylic resin; polyurethane; and an epoxy resin.

30. The nonaqueous electrolyte battery according to claim 10, wherein the heat-resistant fine particles of the separator have an average particle size of 0.3 μm or more.

31. The nonaqueous electrolyte battery according to claim 10, wherein the shutdown layer of the separator is not in contact with the positive active material, and a charging potential of the positive electrode is 4.3 V or more.

32. The battery separator according to claim 1, wherein the heat-resistant layer has a porosity of 20% to 60%.

33. The battery separator according to claim 1, wherein the whole separator has a porosity of 30% to 70%.

34. The nonaqueous electrolyte battery according to claim 10, wherein the heat-resistant layer has a porosity of 20% to 60%.

35. The nonaqueous electrolyte battery according to claim 10, wherein the whole separator has a porosity of 30% to 70%.

36. The battery separator according to claim 1, wherein the microporous film is formed by a solvent extraction method, a dry drawing method, or a wet drawing method.

37. The nonaqueous electrolyte battery according to claim 10, wherein the microporous film is formed by a solvent extraction method, a dry drawing method, or a wet drawing method.

* * * * *